(12) United States Patent
Burnett et al.

(10) Patent No.: US 9,073,104 B2
(45) Date of Patent: Jul. 7, 2015

(54) DRILL CUTTINGS TREATMENT SYSTEMS

(75) Inventors: George Alexander Burnett, Aberdeen (GB); Brian Bender Madsen, Kerteminde (DK); Dale Alton Pierce, The Woodlands, TX (US)

(73) Assignee: National Oilwell Varco, L.P., Houston, TX (US)

( * ) Notice: Subject to any disclaimer, the term of this patent is extended or adjusted under 35 U.S.C. 154(b) by 653 days.

(21) Appl. No.: 13/237,604

(22) Filed: Sep. 20, 2011

(65) Prior Publication Data
US 2012/0073932 A1 Mar. 29, 2012

Related U.S. Application Data

(63) Continuation-in-part of application No. 12/228,670, filed on Aug. 14, 2008, now abandoned.

(51) Int. Cl.
| | | |
|---|---|---|
| *E21B 21/01* | (2006.01) | |
| *B09B 3/00* | (2006.01) | |
| *B09C 1/06* | (2006.01) | |
| *E21B 21/06* | (2006.01) | |
| *F26B 3/36* | (2006.01) | |

(Continued)

(52) U.S. Cl.
CPC ... *B09B 3/00* (2013.01); *B09C 1/06* (2013.01); *E21B 21/066* (2013.01); *F26B 1/00* (2013.01); *F26B 3/36* (2013.01); *F26B 5/08* (2013.01)

(58) Field of Classification Search
CPC ......... E21B 21/01; E21B 21/066; B09B 3/00; F26B 1/00; F26B 3/36; F26B 5/08; B09C 1/06
USPC ...................... 210/86, 97, 149, 767, 770, 774; 175/207
See application file for complete search history.

(56) References Cited

U.S. PATENT DOCUMENTS 1,830,792 A 11/1931 Herrmann ...................... 209/401
1,885,154 A 11/1932 Strezynski et al.

(Continued)

FOREIGN PATENT DOCUMENTS

DE 3819462 C1 5/1990
DE 4127929 A1 2/1993

(Continued)

OTHER PUBLICATIONS

International Search Report from PCT/GB2011/050975 dated Nov. 15, 2012.

(Continued)

*Primary Examiner* — Fred Prince
(74) *Attorney, Agent, or Firm* — Amerson Law Firm, PLLC

(57) ABSTRACT

Generally, the present disclosure is related to systems and methods for separating hydrocarbons and/or other liquids from drill cuttings material. One illustrative embodiment disclosed herein is directed to a system that includes, among other things, a thermal reactor that is adapted to remove liquid from drill cuttings material by heating the drill cuttings material to at least a first temperature that is sufficiently high enough to vaporize the liquid. The illustrative system also includes a feeder system that is adapted to controllably feed a flow of the drill cuttings material to the thermal reactor, and a control system that is adapted to control the flow of the drill cuttings material from the feeder system so as to maintain a temperature in the thermal reactor at or above the first temperature.

23 Claims, 8 Drawing Sheets

(51) Int. Cl.
*F26B 1/00* (2006.01)
*F26B 5/08* (2006.01)

(56) References Cited

U.S. PATENT DOCUMENTS

| | | | |
|---|---|---|---|
| 1,886,174 A | 11/1932 | Hazeltine | 209/269 |
| 2,082,513 A | 6/1937 | Roberts | 210/76 |
| 2,089,548 A | 8/1937 | Frantz et al. | 210/389 |
| 2,112,784 A | 3/1938 | McNitt | 99/105 |
| 2,341,169 A | 2/1944 | Wilson et al. | 73/51 |
| 2,418,529 A | 4/1947 | Stern | 51/309 |
| 2,578,456 A | 12/1951 | Smith | 233/7 |
| 2,653,521 A | 9/1953 | Einarsson | 209/70 |
| 2,711,854 A | 6/1955 | Kjellgren | 494/53 |
| 2,716,493 A | 8/1955 | Hutchison | 209/269 X |
| 2,750,043 A | 6/1956 | Thompson | 210/149 |
| 2,895,669 A | 7/1959 | Bobo | 494/10 |
| 2,919,898 A | 1/1960 | Marwil et al. | 255/1.8 |
| 2,928,546 A | 3/1960 | Church | 210/319 |
| 2,938,393 A | 5/1960 | Dunn et al. | 74/61 |
| 2,942,731 A | 6/1960 | Soldini | 209/293 |
| 2,955,753 A | 10/1960 | O'Conor et al. | 494/5 |
| 2,961,154 A | 11/1960 | Bergey | 494/1 |
| 3,012,674 A | 12/1961 | Hoppe | 209/401 |
| 3,053,379 A | 9/1962 | Roder et al. | 198/220 |
| 3,064,806 A | 11/1962 | Tapani | 209/17 |
| 3,070,291 A | 12/1962 | Bergey | 494/1 |
| 3,219,107 A | 11/1965 | Brown et al. | 166/8 |
| 3,226,989 A | 1/1966 | Robins | 74/87 |
| 3,268,159 A | 8/1966 | Kern | 233/7 |
| 3,302,720 A | 2/1967 | Brandon | 166/42 |
| 3,498,393 A | 3/1970 | West et al. | 175/48 |
| 3,605,919 A | 9/1971 | Bromell et al. | 175/27 |
| 3,629,859 A | 12/1971 | Copland et al. | 340/172.5 |
| 3,640,344 A | 2/1972 | Brandon | 166/307 |
| 3,659,465 A | 5/1972 | Oshima et al. | 74/61 |
| 3,726,136 A | 4/1973 | McKean et al. | 73/155 |
| 3,795,361 A | 3/1974 | Lee | 233/7 |
| 3,796,299 A | 3/1974 | Musschoot | 198/220 |
| 3,855,380 A | 12/1974 | Gordon et al. | 264/97 |
| 3,874,733 A | 4/1975 | Poundstone et al. | 299/17 |
| 3,885,734 A | 5/1975 | Lee | 233/3 |
| 3,900,393 A | 8/1975 | Wilson | 209/399 |
| 3,934,792 A | 1/1976 | High et al. | 233/7 |
| 3,955,411 A | 5/1976 | Lawson, Jr. | 73/155 |
| 3,968,033 A | 7/1976 | Illemann et al. | 209/403 |
| 3,993,146 A | 11/1976 | Poundstone et al. | 175/206 |
| 4,000,074 A | 12/1976 | Evans | 210/369 |
| 4,033,865 A | 7/1977 | Derrick, Jr. | 209/275 |
| 4,038,152 A | 7/1977 | Atkins | 201/2.5 |
| 4,082,657 A | 4/1978 | Gage | 209/311 |
| 4,085,888 A | 4/1978 | Jager | 233/7 |
| 4,115,507 A | 9/1978 | Pico et al. | 264/267 |
| 4,192,743 A | 3/1980 | Bastgen et al. | 210/712 |
| 4,208,906 A | 6/1980 | Roberts, Jr. | 73/155 |
| 4,212,731 A | 7/1980 | Wallin et al. | 209/366.5 |
| 4,222,988 A | 9/1980 | Barthel | 422/309 |
| 4,224,821 A | 9/1980 | Taylor et al. | 73/32 R |
| 4,228,949 A | 10/1980 | Jackson | 233/7 |
| 4,233,181 A | 11/1980 | Goller et al. | 252/425.3 |
| 4,240,578 A | 12/1980 | Jackson | 233/7 |
| 4,297,225 A | 10/1981 | Hartley | 210/779 |
| 4,298,160 A | 11/1981 | Jackson | 233/7 |
| 4,298,162 A | 11/1981 | Hohne | 233/7 |
| 4,298,572 A | 11/1981 | Moffet et al. | 422/68 |
| 4,306,974 A | 12/1981 | Harry | 210/388 |
| 4,319,482 A | 3/1982 | Bunner | 73/153 |
| 4,322,288 A | 3/1982 | Schmidt | 209/356 |
| 4,339,072 A | 7/1982 | Hiller | 233/7 |
| 4,350,591 A | 9/1982 | Lee | 210/384 |
| 4,369,915 A | 1/1983 | Oberg et al. | 494/8 |
| 4,378,906 A | 4/1983 | Epper et al. | 494/54 |
| 4,411,074 A | 10/1983 | Daly | 34/32 |
| 4,432,064 A | 2/1984 | Barker et al. | 364/550 |
| 4,446,022 A | 5/1984 | Harry | 210/388 |
| 4,459,207 A | 7/1984 | Young | 209/269 |
| 4,482,459 A | 11/1984 | Shiver | 210/639 |
| 4,495,065 A | 1/1985 | DeReamer et al. | 209/243 |
| 4,526,687 A | 7/1985 | Nugent | 210/202 |
| 4,536,286 A | 8/1985 | Nugent | 210/202 |
| 4,546,783 A | 10/1985 | Lott | 134/109 |
| 4,549,431 A | 10/1985 | Soeiinah | 73/152.49 |
| 4,553,429 A | 11/1985 | Evans et al. | 73/152.21 |
| 4,573,115 A | 2/1986 | Halgrimson | 364/138 |
| 4,575,336 A | 3/1986 | Mudd et al. | 432/72 |
| 4,606,415 A | 8/1986 | Gray, Jr. et al. | 175/24 |
| 4,624,417 A | 11/1986 | Gangi | 241/17 |
| 4,634,535 A | 1/1987 | Lott | 210/780 |
| 4,635,735 A | 1/1987 | Crownover | 175/48 |
| 4,639,258 A | 1/1987 | Schellstede et al. | 95/260 |
| 4,650,687 A | 3/1987 | Willard et al. | 426/438 |
| 4,668,213 A | 5/1987 | Kramer | 494/8 |
| 4,685,329 A | 8/1987 | Burgess | 73/151 |
| 4,696,353 A | 9/1987 | Elmquist et al. | 175/206 |
| 4,696,751 A | 9/1987 | Eifling | 210/780 |
| 4,729,548 A | 3/1988 | Sullins | 266/44 |
| 4,743,226 A | 5/1988 | Day et al. | 494/53 |
| 4,751,887 A | 6/1988 | Terry et al. | 110/246 |
| 4,770,711 A | 9/1988 | Deal, III et al. | 134/18 |
| 4,783,057 A | 11/1988 | Sullins | 266/44 |
| 4,791,002 A | 12/1988 | Baker et al. | 426/641 |
| 4,793,421 A | 12/1988 | Jasinski | 175/27 |
| 4,795,552 A | 1/1989 | Yun et al. | 209/319 |
| 4,799,987 A | 1/1989 | Sullins | 156/425 |
| 4,805,659 A | 2/1989 | Gunnewig et al. | 137/118 |
| 4,807,469 A | 2/1989 | Hall | 73/155 |
| 4,809,791 A | 3/1989 | Hayatdavoudi | 175/40 |
| 4,832,853 A | 5/1989 | Shiraki et al. | 210/781 |
| 4,844,106 A | 7/1989 | Hunter et al. | 134/73 |
| 4,846,352 A | 7/1989 | Bailey | 209/399 |
| 4,857,176 A | 8/1989 | Derrick et al. | 209/392 |
| 4,882,054 A | 11/1989 | Derrick et al. | 210/389 |
| 4,889,733 A | 12/1989 | Willard et al. | 426/438 |
| 4,889,737 A | 12/1989 | Willard et al. | 426/550 |
| 4,895,665 A | 1/1990 | Colelli et al. | 210/710 |
| 4,895,731 A | 1/1990 | Baker et al. | 426/641 |
| 4,896,835 A | 1/1990 | Fahrenholz | 241/74 |
| 4,911,834 A | 3/1990 | Murphy | 210/167 |
| 4,915,452 A | 4/1990 | Dibble | 299/17 |
| 4,940,535 A | 7/1990 | Fisher et al. | 209/250 |
| 4,942,929 A | 7/1990 | Malachosky et al. | 175/66 |
| 4,961,722 A | 10/1990 | Taylor et al. | 494/36 |
| 5,010,966 A | 4/1991 | Stokley et al. | 175/66 |
| 5,053,082 A | 10/1991 | Flanigan et al. | 134/25.1 |
| 5,066,350 A | 11/1991 | Sullins | 156/187 |
| 5,080,721 A | 1/1992 | Flanigan et al. | 134/26 |
| 5,107,874 A | 4/1992 | Flanigan et al. | 134/60 |
| 5,109,933 A | 5/1992 | Jackson | 175/66 |
| 5,129,469 A | 7/1992 | Jackson | 175/66 |
| 5,131,271 A | 7/1992 | Haynes et al. | 73/290 |
| 5,145,256 A | 9/1992 | Wiemers et al. | 366/336 |
| 5,147,277 A | 9/1992 | Shapiro | 494/53 |
| 5,156,749 A | 10/1992 | Williams | 210/770 |
| 5,156,751 A | 10/1992 | Miller | 210/787 |
| 5,181,578 A | 1/1993 | Lawler | 175/424 |
| 5,190,645 A | 3/1993 | Burgess | 210/144 |
| 5,200,372 A | 4/1993 | Kuroyama et al. | 501/96 |
| 5,203,762 A | 4/1993 | Cooperstein | 494/7 |
| 5,221,008 A | 6/1993 | Derrick, Jr. et al. | 209/269 |
| 5,226,546 A | 7/1993 | Janssens et al. | 209/319 |
| 5,227,057 A | 7/1993 | Lundquist | 210/174 |
| 5,232,099 A | 8/1993 | Maynard | 209/311 |
| 5,253,718 A | 10/1993 | Lawler | 175/20 |
| 5,265,730 A | 11/1993 | Norris et al. | 209/326 |
| 5,273,112 A | 12/1993 | Schultz | 166/374 |
| 5,278,549 A | 1/1994 | Crawford | 340/853.2 |
| 5,314,058 A | 5/1994 | Graham | 198/753 |
| 5,319,972 A | 6/1994 | Oblak et al. | 73/290 |
| 5,329,465 A | 7/1994 | Arcella et al. | 364/551.01 |
| 5,332,101 A | 7/1994 | Bakula | 209/403 |
| 5,337,966 A | 8/1994 | Francis et al. | 241/46.06 |
| 5,378,364 A | 1/1995 | Welling | 210/512.1 |
| 5,385,669 A | 1/1995 | Leone, Sr. | 210/488 |
| 5,392,925 A | 2/1995 | Seyffert | 209/405 |

(56) References Cited

U.S. PATENT DOCUMENTS

| | | | |
|---|---|---|---|
| 5,400,376 A | 3/1995 | Trudeau | 377/21 |
| 5,403,260 A | 4/1995 | Hensely | 494/53 |
| 5,454,957 A | 10/1995 | Roff | 210/768 |
| 5,465,798 A | 11/1995 | Edlund et al. | 175/24 |
| 5,474,142 A | 12/1995 | Bowden | 175/27 |
| 5,488,104 A | 1/1996 | Schulz | 536/86 |
| 5,489,204 A | 2/1996 | Conwell et al. | 432/153 |
| 5,494,584 A | 2/1996 | McLachlan et al. | 210/739 |
| 5,516,348 A | 5/1996 | Conwell et al. | 51/309 |
| 5,534,207 A | 7/1996 | Burrus | 264/150 |
| 5,547,479 A | 8/1996 | Conwell et al. | 51/309 |
| 5,566,889 A | 10/1996 | Preiss | 241/19 |
| 5,567,150 A | 10/1996 | Conwell et al. | 432/14 |
| 5,570,749 A | 11/1996 | Reed | 175/66 |
| 5,597,042 A | 1/1997 | Tubel et al. | 166/250.01 |
| 5,632,714 A | 5/1997 | Leung et al. | 494/53 |
| 5,638,960 A | 6/1997 | Beuermann et al. | 209/397 |
| 5,643,169 A | 7/1997 | Leung et al. | 494/53 |
| 5,653,674 A | 8/1997 | Leung | 494/53 |
| 5,662,165 A | 9/1997 | Tubel et al. | 166/250.01 |
| 5,669,941 A | 9/1997 | Peterson | 51/295 |
| 5,681,256 A | 10/1997 | Nagafuji | 494/9 |
| D386,874 S | 11/1997 | Glaun | D34/29 |
| D387,534 S | 12/1997 | Glaun | D34/29 |
| D388,583 S | 12/1997 | Glaun | D34/29 |
| 5,695,442 A | 12/1997 | Leung et al. | 494/37 |
| 5,699,918 A | 12/1997 | Dunn | 209/397 |
| D388,924 S | 1/1998 | Glaun | D34/29 |
| 5,706,896 A | 1/1998 | Tubel et al. | 166/313 |
| 5,730,219 A | 3/1998 | Tubel et al. | 166/250.01 |
| 5,732,776 A | 3/1998 | Tubel et al. | 166/250.15 |
| 5,732,828 A | 3/1998 | Littlefield, Jr. | 209/365.1 |
| 5,771,601 A | 6/1998 | Veal et al. | 34/314 |
| 5,772,573 A | 6/1998 | Hao | 494/15 |
| 5,791,494 A | 8/1998 | Meyer | 209/368 |
| 5,793,705 A | 8/1998 | Gazis et al. | 367/98 |
| 5,811,003 A | 9/1998 | Young et al. | 210/388 |
| 5,814,230 A | 9/1998 | Willis et al. | 210/710 |
| 5,816,413 A | 10/1998 | Boccabella et al. | 209/399 |
| 5,819,952 A | 10/1998 | Cook et al. | 209/400 |
| 5,839,521 A | 11/1998 | Reddoch | 100/37 |
| 5,857,955 A | 1/1999 | Phillips | 494/7 |
| 5,868,125 A | 2/1999 | Maoujoud | 125/15 |
| 5,896,998 A | 4/1999 | Bjorklund et al. | 209/326 |
| 5,899,844 A | 5/1999 | Eberle, Sr. | 494/37 |
| 5,913,767 A | 6/1999 | Feldkamp et al. | 494/4 |
| 5,919,123 A | 7/1999 | Phillips | 494/7 |
| 5,942,130 A | 8/1999 | Leung | 210/784 |
| 5,944,197 A | 8/1999 | Baltzer et al. | 209/400 |
| 5,948,256 A | 9/1999 | Leung | 210/374 |
| 5,948,271 A | 9/1999 | Wardwell et al. | 210/739 |
| 5,952,569 A | 9/1999 | Jervis et al. | 73/152.01 |
| 5,955,666 A | 9/1999 | Mullins | 73/152.18 |
| 5,958,235 A | 9/1999 | Leung | 210/374 |
| 5,971,307 A | 10/1999 | Davenport | 241/259.1 |
| 5,975,204 A | 11/1999 | Tubel et al. | 166/250.15 |
| 5,992,519 A | 11/1999 | Ramakrishnan et al. | 166/250.15 |
| 6,012,016 A | 1/2000 | Bilden et al. | 702/12 |
| 6,013,158 A | 1/2000 | Wootten | 202/99 |
| 6,021,377 A | 2/2000 | Dubinsky et al. | 702/9 |
| 6,024,228 A | 2/2000 | Williams | 209/272 |
| 6,045,070 A | 4/2000 | Davenport | 241/60 |
| 6,062,070 A | 5/2000 | Maltby et al. | 73/61.49 |
| 6,063,292 A | 5/2000 | Leung | 210/374 |
| 6,089,380 A | 7/2000 | Hazrati et al. | 210/411 |
| 6,102,310 A | 8/2000 | Davenport | 241/21 |
| 6,105,689 A | 8/2000 | McGuire et al. | 175/48 |
| 6,109,452 A | 8/2000 | Leung et al. | 210/369 |
| 6,110,096 A | 8/2000 | Leung et al. | 494/53 |
| 6,123,656 A | 9/2000 | Michelsen | 494/54 |
| 6,138,834 A | 10/2000 | Southall | 209/17 |
| 6,143,183 A | 11/2000 | Wardwell et al. | 210/739 |
| 6,145,669 A | 11/2000 | Leung | 210/374 |
| 6,155,428 A | 12/2000 | Bailey et al. | 209/315 |
| 6,161,700 A | 12/2000 | Bakula | 209/401 |
| 6,165,323 A | 12/2000 | Shearer | 162/251 |
| 6,170,580 B1 | 1/2001 | Reddoch | 175/66 |
| 6,173,609 B1 | 1/2001 | Modlin et al. | 73/293 |
| 6,176,323 B1 | 1/2001 | Weirich et al. | 175/40 |
| 6,179,128 B1 | 1/2001 | Seyffert | 209/405 |
| 6,192,742 B1 | 2/2001 | Miwa et al. | 73/40 |
| 6,192,980 B1 | 2/2001 | Tubel et al. | 166/65.1 |
| 6,217,830 B1 | 4/2001 | Roberts et al. | 422/140 |
| 6,223,906 B1 | 5/2001 | Williams | 210/400 |
| 6,233,524 B1 | 5/2001 | Harrell et al. | 702/9 |
| 6,234,250 B1 | 5/2001 | Green et al. | 166/250.03 |
| 6,237,404 B1 | 5/2001 | Crary et al. | 73/152.03 |
| 6,267,250 B1 | 7/2001 | Leung et al. | 210/369 |
| 6,279,471 B1 | 8/2001 | Reddoch | 100/37 |
| D448,488 S | 9/2001 | Chaffiotte et al. | D24/219 |
| 6,283,302 B1 | 9/2001 | Schulte et al. | 209/399 |
| 6,290,636 B1 | 9/2001 | Hiller, Jr. et al. | 494/53 |
| 6,308,787 B1 | 10/2001 | Alft | 175/48 |
| 6,315,894 B1 | 11/2001 | Wiemers et al. | 210/96.1 |
| 6,333,700 B1 | 12/2001 | Thomeer et al. | 340/854.8 |
| 6,346,813 B1 | 2/2002 | Kleinberg | 324/303 |
| 6,349,834 B1 | 2/2002 | Carr et al. | 209/366.5 |
| 6,352,159 B1 | 3/2002 | Loshe | 209/268 |
| 6,356,205 B1 | 3/2002 | Salvo et al. | 340/853.3 |
| 6,367,633 B1 | 4/2002 | Douglas | 209/311 |
| 6,368,264 B1 | 4/2002 | Phillips et al. | 494/5 |
| 6,371,301 B1 | 4/2002 | Schulte et al. | 209/405 |
| 6,378,628 B1 | 4/2002 | McGuire et al. | 175/48 |
| 6,393,363 B1 | 5/2002 | Wilt et al. | 702/6 |
| 6,399,851 B1 | 6/2002 | Siddle | 203/87 |
| 6,408,953 B1 | 6/2002 | Goldman et al. | 175/39 |
| 6,412,644 B1 | 7/2002 | Crabbe et al. | 209/309 |
| 6,429,653 B1 | 8/2002 | Kruspe et al. | 324/303 |
| 6,438,495 B1 | 8/2002 | Chau et al. | 702/9 |
| 6,439,391 B1 | 8/2002 | Seyffert | 209/238 |
| 6,461,286 B1 | 10/2002 | Beatley | 494/8 |
| 6,474,143 B1 | 11/2002 | Herod | 73/54.01 |
| 6,484,088 B1 | 11/2002 | Reimer | 701/123 |
| 6,485,640 B2 | 11/2002 | Fout et al. | 210/188 |
| 6,505,682 B2 | 1/2003 | Brockman | 166/250.15 |
| 6,506,310 B2 | 1/2003 | Kulbeth | 210/780 |
| 6,510,947 B1 | 1/2003 | Schulte et al. | 210/388 |
| 6,513,664 B1 | 2/2003 | Logan et al. | 209/367 |
| 6,517,733 B1 | 2/2003 | Carlson | 210/785 |
| 6,519,568 B1 | 2/2003 | Harvey et al. | 705/1 |
| 6,530,438 B1 * | 3/2003 | McIntyre | 175/66 |
| 6,536,540 B2 | 3/2003 | deBoer | 175/70 |
| 6,553,316 B2 | 4/2003 | Bary et al. | 702/16 |
| 6,553,336 B1 | 4/2003 | Johnson et al. | 702/188 |
| 6,575,304 B2 | 6/2003 | Cudahy | 209/365.3 |
| 6,581,455 B1 | 6/2003 | Berger et al. | 73/152.55 |
| 6,600,278 B1 | 7/2003 | Bretzius | 318/34 |
| 6,601,709 B2 | 8/2003 | Schulte et al. | 209/397 |
| 6,605,029 B1 | 8/2003 | Koch et al. | 494/53 |
| 6,662,952 B2 | 12/2003 | Adams et al. | 209/319 |
| 6,669,027 B1 | 12/2003 | Mooney et al. | 209/405 |
| 6,679,385 B2 | 1/2004 | Suter et al. | 209/367 |
| 6,691,025 B2 | 2/2004 | Reimer | 701/123 |
| 6,693,553 B1 | 2/2004 | Ciglenec et al. | 340/853.1 |
| 6,715,612 B1 | 4/2004 | Krystof | 209/331 |
| 6,722,504 B2 | 4/2004 | Schulte et al. | 209/359 |
| 6,746,602 B2 | 6/2004 | Fout et al. | 210/188 |
| 6,763,605 B2 | 7/2004 | Reddoch | 34/58 |
| 6,766,254 B1 | 7/2004 | Bradford et al. | 702/9 |
| 6,769,550 B2 | 8/2004 | Adams et al. | 209/399 |
| 6,780,147 B2 | 8/2004 | Koch et al. | 494/53 |
| 6,783,088 B1 | 8/2004 | Gillis et al. | 241/19 |
| 6,783,685 B2 | 8/2004 | Huang | 210/690 |
| 6,790,169 B2 | 9/2004 | Koch et al. | 494/53 |
| 6,793,814 B2 | 9/2004 | Fout et al. | 210/188 |
| 6,827,223 B2 | 12/2004 | Colgrove et al. | 209/365.3 |
| 6,838,008 B2 | 1/2005 | Fout et al. | 210/780 |
| 6,860,845 B1 | 3/2005 | Miller et al. | 494/1 |
| 6,863,183 B2 | 3/2005 | Schulte et al. | 209/405 |
| 6,863,809 B2 | 3/2005 | Smith et al. | 210/202 |
| 6,868,920 B2 | 3/2005 | Hoteit et al. | 175/25 |
| 6,868,972 B2 | 3/2005 | Seyffert et al. | 209/254 |
| 6,873,267 B1 | 3/2005 | Tubel et al. | 340/853.3 |
| 6,892,812 B2 | 5/2005 | Niedermayr et al. | 166/250.15 |

(56) References Cited

U.S. PATENT DOCUMENTS

| | | | |
|---|---|---|---|
| 6,896,055 B2 | 5/2005 | Koithan | 166/250.15 |
| 6,899,178 B2 | 5/2005 | Tubel | 166/313 |
| 6,905,452 B1 | 6/2005 | Kirsch | 494/8 |
| 6,907,375 B2 | 6/2005 | Guggari et al. | 702/113 |
| 6,926,101 B2 | 8/2005 | deBoer | 175/70 |
| 6,932,169 B2 | 8/2005 | Wylie et al. | 175/66 |
| 6,932,757 B2 | 8/2005 | Beattey | 494/55 |
| 6,971,982 B1 | 12/2005 | Kirsch | 494/8 |
| 6,981,940 B2 | 1/2006 | Rafferty | 494/7 |
| 7,001,324 B2 | 2/2006 | Hensley et al. | 494/53 |
| 7,018,326 B2 | 3/2006 | Koch et al. | 494/53 |
| 7,041,044 B2 | 5/2006 | Gilbert | 494/53 |
| D524,825 S | 7/2006 | Koch et al. | D15/21 |
| 7,093,678 B2 | 8/2006 | Risher et al. | 175/66 |
| 7,144,516 B2 | 12/2006 | Smith | 210/803 |
| 7,175,027 B2 | 2/2007 | Strong et al. | 209/405 |
| 7,195,084 B2 | 3/2007 | Burnett et al. | 175/66 |
| 7,198,156 B2 | 4/2007 | Schulte et al. | 209/309 |
| 7,216,767 B2 | 5/2007 | Schulte et al. | 209/309 |
| 7,228,971 B2 | 6/2007 | Mooney et al. | 209/396 |
| 7,264,125 B2 | 9/2007 | Lipa | 209/397 |
| 7,284,665 B2 | 10/2007 | Fuchs | 209/270 |
| 7,303,079 B2 | 12/2007 | Reid-Robertson et al. | 209/405 |
| 7,306,057 B2 | 12/2007 | Strong et al. | 175/66 |
| 7,316,321 B2 | 1/2008 | Robertson et al. | 209/400 |
| 7,337,860 B2 | 3/2008 | McIntyre | 175/66 |
| 7,373,996 B1 | 5/2008 | Martin et al. | 175/206 |
| 7,387,602 B1 | 6/2008 | Kirsch | 494/8 |
| 7,514,011 B2 | 4/2009 | Kulbeth | 210/780 |
| 7,540,837 B2 | 6/2009 | Scott et al. | 494/7 |
| 7,540,838 B2 | 6/2009 | Scott et al. | 494/7 |
| 7,581,569 B2 | 9/2009 | Beck | 139/425 R |
| 7,770,665 B2 | 8/2010 | Eia et al. | 175/66 |
| 2001/0032815 A1 | 10/2001 | Adams et al. | 210/388 |
| 2002/0000399 A1 | 1/2002 | Winkler et al. | 209/399 |
| 2002/0018399 A1 | 2/2002 | Schultz et al. | 361/81 |
| 2002/0033278 A1 | 3/2002 | Reddoch | 175/57 |
| 2002/0033358 A1 | 3/2002 | Bakula | 209/331 |
| 2002/0035551 A1 | 3/2002 | Sherwin et al. | 705/412 |
| 2002/0065698 A1 | 5/2002 | Schick et al. | 705/8 |
| 2002/0112888 A1 | 8/2002 | Leuchtenberg | 175/48 |
| 2002/0134709 A1 | 9/2002 | Riddle | 209/238 |
| 2003/0015351 A1 | 1/2003 | Goldman et al. | 175/39 |
| 2003/0037922 A1* | 2/2003 | Gibson | 166/206 |
| 2003/0038734 A1 | 2/2003 | Hirsch et al. | 340/853.1 |
| 2003/0109951 A1 | 6/2003 | Hsiung et al. | 700/108 |
| 2003/0220742 A1 | 11/2003 | Niedermayr et al. | 702/9 |
| 2004/0040746 A1 | 3/2004 | Niedermayr et al. | 175/38 |
| 2004/0051650 A1 | 3/2004 | Gonsoulin et al. | 340/853.1 |
| 2004/0156920 A1 | 8/2004 | Kane | 424/725 |
| 2004/0245155 A1 | 12/2004 | Strong et al. | 209/405 |
| 2005/0103689 A1 | 5/2005 | Schulte, Jr. et al. | 209/405 |
| 2005/0236305 A1 | 10/2005 | Schulte, Jr. et al. | 209/403 |
| 2005/0255186 A1 | 11/2005 | Hiraga | 425/542 |
| 2005/0279715 A1* | 12/2005 | Strong et al. | 210/774 |
| 2006/0019812 A1 | 1/2006 | Stalwick | 494/42 |
| 2006/0034988 A1 | 2/2006 | Bresnahan et al. | 426/502 |
| 2006/0081508 A1 | 4/2006 | Astleford et al. | 209/309 |
| 2006/0102390 A1 | 5/2006 | Burnett et al. | 175/66 |
| 2006/0105896 A1 | 5/2006 | Smith et al. | 494/7 |
| 2006/0144779 A1 | 7/2006 | Bailey | 210/330 |
| 2007/0108106 A1 | 5/2007 | Burnett | 209/325 |
| 2007/0131592 A1 | 6/2007 | Browne et al. | 209/399 |
| 2008/0078697 A1 | 4/2008 | Carr | 209/49 |
| 2008/0078702 A1 | 4/2008 | Carr et al. | 209/326 |
| 2008/0078704 A1 | 4/2008 | Carr et al. | 209/399 |
| 2008/0083566 A1* | 4/2008 | Burnett | 175/66 |
| 2008/0093269 A1 | 4/2008 | Timmerman et al. | 209/405 |
| 2008/0179090 A1 | 7/2008 | Eia et al. | 175/5 |
| 2008/0179096 A1 | 7/2008 | Eia et al. | 175/66 |
| 2008/0179097 A1 | 7/2008 | Eia et al. | 175/66 |
| 2009/0071878 A1 | 3/2009 | Bosse | 209/391 |
| 2009/0105059 A1 | 4/2009 | Dorry et al. | 494/37 |
| 2009/0178978 A1 | 7/2009 | Beebe et al. | 210/747 |
| 2009/0211106 A1* | 8/2009 | McKenzie | 34/92 |
| 2009/0242466 A1 | 10/2009 | Burnett et al. | 209/555 |
| 2009/0286098 A1 | 11/2009 | Yajima et al. | 428/507 |
| 2009/0316084 A1 | 12/2009 | Yajima et al. | 349/96 |
| 2010/0084190 A1 | 4/2010 | Eia et al. | 175/5 |
| 2010/0119570 A1 | 5/2010 | Potter et al. | 424/422 |

FOREIGN PATENT DOCUMENTS

| | | | |
|---|---|---|---|
| EP | 0289668 A1 | 9/1988 | |
| FR | 2 611 559 | 9/1988 | |
| FR | 2 636 669 | 3/1990 | |
| GB | 1 526 663 | 9/1978 | |
| GB | 2 030 482 A | 4/1980 | |
| GB | 2 327 442 A | 1/1999 | |
| GB | 2 408 006 B | 4/2007 | B07B 1/46 |
| GB | 2448683 A | 10/2008 | |
| JP | 55112761 | 8/1980 | |
| JP | 59069268 | 4/1984 | |
| JP | 63003090 | 1/1988 | |
| JP | 63283860 | 11/1988 | |
| JP | 63290705 | 11/1988 | |
| JP | 02127030 | 5/1990 | |
| JP | 02167834 | 6/1990 | |
| JP | 03240925 | 10/1991 | |
| JP | 03264263 | 11/1991 | |
| JP | 04093045 | 3/1992 | |
| JP | 04269170 | 9/1992 | |
| JP | 05043884 | 2/1993 | |
| JP | 05301158 | 11/1993 | |
| JP | 06063499 | 3/1994 | |
| JP | 07304028 | 11/1995 | |
| JP | 08039428 | 2/1996 | |
| JP | 08270355 | 10/1996 | |
| JP | 09109032 | 4/1997 | |
| JP | 10337598 | 12/1998 | |
| WO | WO96/08301 | 3/1996 | |
| WO | WO98/10895 | 3/1998 | |
| WO | 9838411 | 9/1998 | |
| WO | WO2004/110589 A1 | 12/2004 | |
| WO | WO2005/107963 A2 | 11/2005 | |
| WO | WO 2008/042844 A1 | 4/2008 | B07B 1/28 |
| WO | 2008050138 A1 | 5/2008 | |
| WO | 2008059240 A2 | 5/2008 | |
| WO | WO2009/048783 A2 | 4/2009 | |

OTHER PUBLICATIONS

U.S. Appl. No. 12/785,735 Office Action dated Dec. 9, 2011.
U.S. Appl. No. 12/490,492 Office Action dated Oct. 7, 2011.
U.S. Appl. No. 12/481,959 Final Office Action dated Oct. 27, 2010.
U.S. Appl. No. 12/481,959 Office Action dated Jun. 7, 2010.
U.S. Appl. No. 12/469,851 Final Office Action dated Nov. 9, 2010.
U.S. Appl. No. 12/469,851 Office Action dated Jun. 28, 2010.
U.S. Appl. No. 12/321,358 Final Office Action dated Jan. 18, 2012.
U.S. Appl. No. 12/321,358 Office Action dated Aug. 29, 2011.
U.S. Appl. No. 12/287,716 Office Action dated Jun. 17, 2011.
U.S. Appl. No. 12/287,709 Office Action dated Mar. 29, 2011.
U.S. Appl. No. 12/231,293 Office Action dated Sep. 13, 2011.
U.S. Appl. No. 12/228,670 Office Action dated Jun. 20, 2011.
U.S. Appl. No. 12/227,462 Final Office Action dated May 26, 2011.
U.S. Appl. No. 12/227,462 Office Action dated Nov. 15, 2010.
U.S. Appl. No. 12/008,980 Office Action dated Aug. 31, 2011.
U.S. Appl. No. 12/008,980 Office Action dated Apr. 5, 2011.
U.S. Appl. No. 12/001,479 Final Office Action dated Oct. 31, 2011.
U.S. Appl. No. 12/001,479 Office Action dated Jun. 8, 2011.
U.S. Appl. No. 11/897,976 Final Office Action dated Sep. 1, 2010.
U.S. Appl. No. 11/897,976 Office Action dated Apr. 1, 2010.
U.S. Appl. No. 11/897,975 Office Action dated Jun. 8, 2012.
U.S. Appl. No. 11/897,975 Final Office Action dated Aug. 12, 2011.
U.S. Appl. No. 11/897,975 Office Action dated Mar. 1, 2011.
U.S. Appl. No. 11/897,975 Final Office Action dated Jul. 21, 2010.
U.S. Appl. No. 11/897,975 Office Action dated Feb. 19, 2010.
U.S. Appl. No. 11/637,615 Final Office Action dated Nov. 16, 2011.
U.S. Appl. No. 11/637,615 Office Action dated Jul. 21, 2011.
U.S. Appl. No. 11/637,615 Final Office Action dated Aug. 2, 2010.
U.S. Appl. No. 11/637,615 Office Action dated Mar. 2, 2010.

(56) References Cited

OTHER PUBLICATIONS

International Search Report and Written Opinion from PCT/GB2010/051050 dated Jan. 30, 2012.
EP Application No. 07 733 775.6 EPC Communication dated Dec. 9, 2010.
Polyamide 6/6—Nylon 6/6—PA 6/6 60% Glass Fibre Reinforced, Data Sheet [online], AZoM™, The A to Z of Materials and AZojomo, The "AZo Journal of Materials Online" [retrieved on Nov. 23, 2005] (2005) (Retrieved from the Internet: <URL: http://web.archive.org/web/20051123025735/http://www.azom.com/details.asp?ArticleID=493>.
Adams et al., "The Advanced Technology Linear Separator Model ATL-1000," Drexel Oilfield Services, STC 03, 18 pages (1991).
AMS 2000 Description, Thule Rigtech, Rig Technology, 18 pages (2000).
Automated Chemical Additive System, Thule Rigtech, Rig Technology Ltd., 4 pages (2000).
Brandt Automated Shaker Control, Varco, 1 page (2002).
Brandt®, A Varco Company, King Cobra Series, Installation, Operation, and Maintenance Manual, M12444 R5, 65 pages (2003).
Brandt®, A Varco Company, LCM-2D LP Installation and Operation Manual, 84 pages (1998).
Brandt et al., Mud Equipment Manual—Handbook 3: Shale Shakers, Gulf Pub. Co., 18 pages (1982).
The Derrick LP Sandwich Shaker, Derrick Equipment Company, 4 pages (1981).
Fluid Systems Inc., The Prodigy Series I™ Dynamic Control Shaker, 2 pages (Apr. 27, 2004).
Sweco® Oilfield Services, LM-3 Full-Flo™ Shale Shaker, 4 pages (1991).

\* cited by examiner

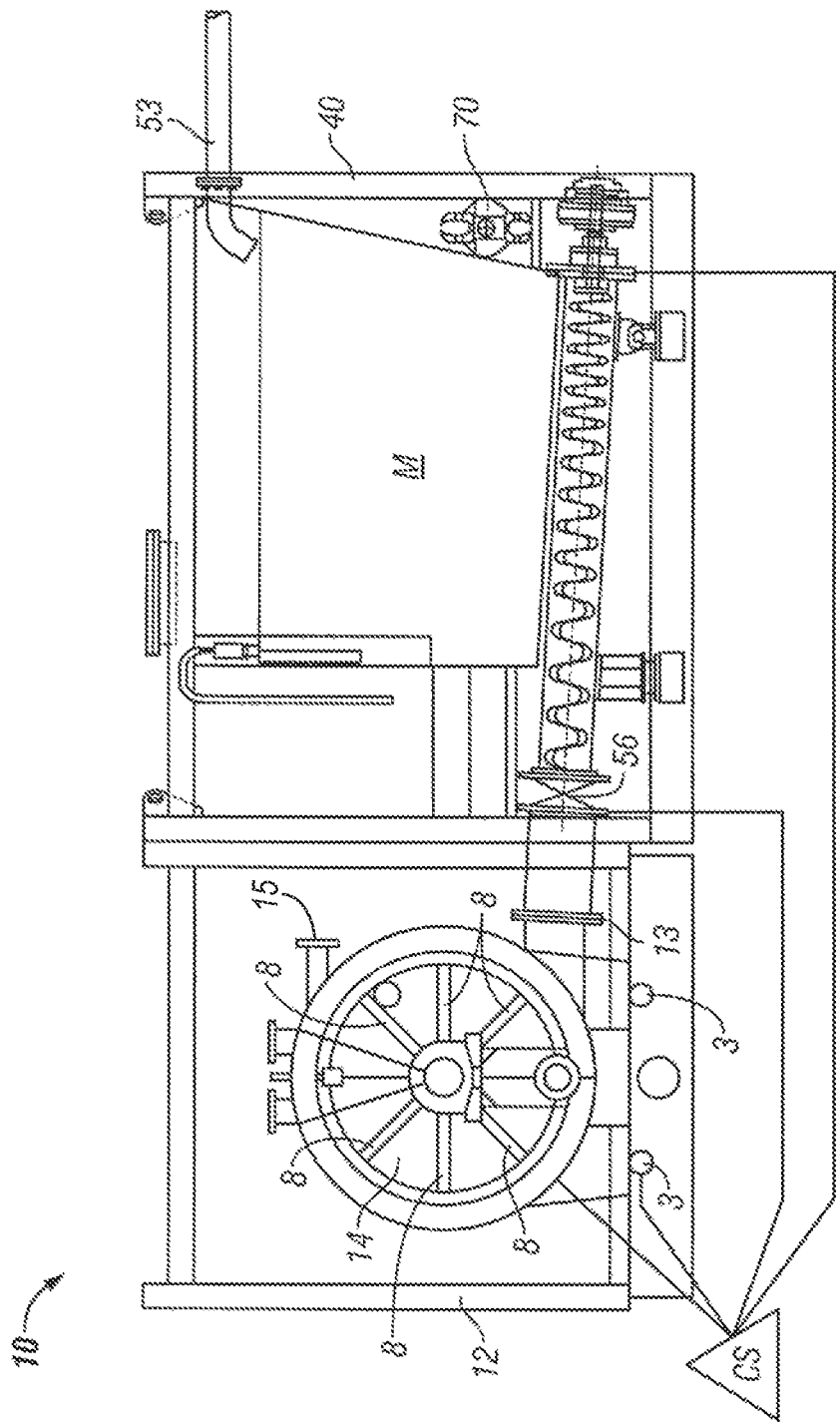

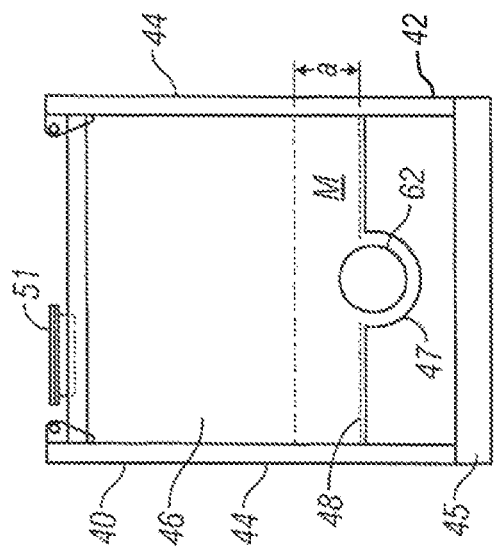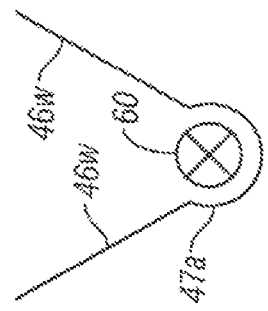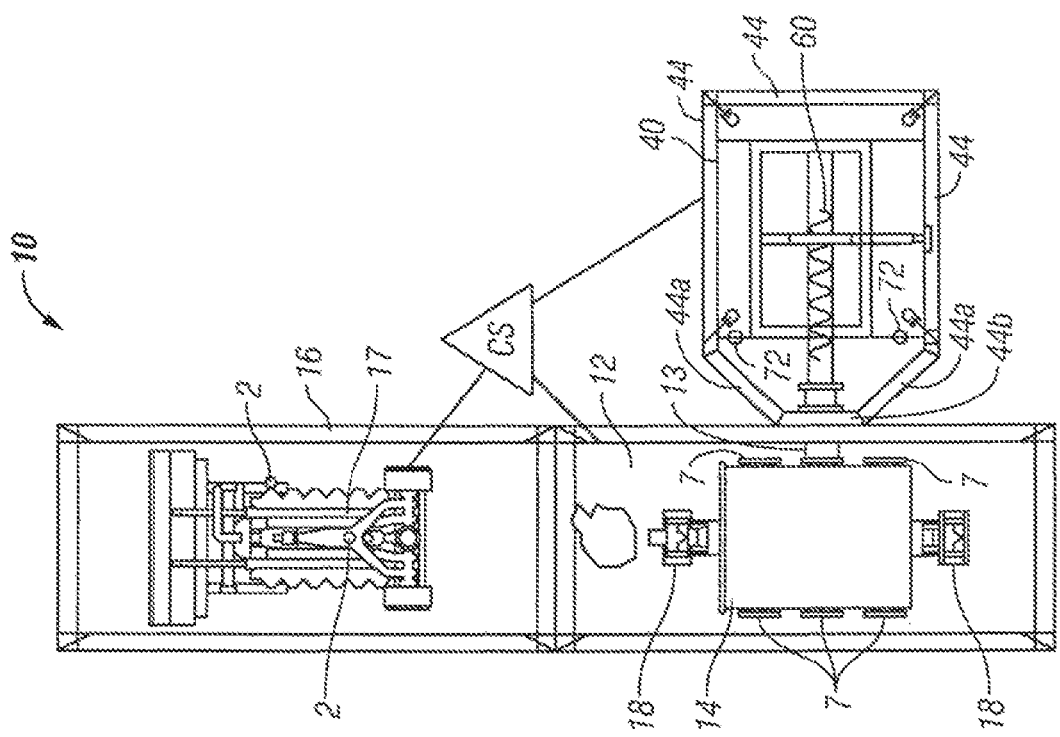

DRILL CUTTINGS TREATMENT SYSTEMS

CROSS-REFERENCE TO RELATED APPLICATIONS

This application is a continuation-in-part of application Ser. No. 12/228,670, filed Aug. 14, 2008, now abandoned which is incorporated fully herein by reference.

BACKGROUND OF THE INVENTION

1. Field of the Invention

Generally, the present disclosure relates to systems and methods for separating hydrocarbons and/or other liquids from the drill cuttings material from a wellbore being drilled in the earth, and, in certain particular aspects, to such systems and methods which employ a feed apparatus for feeding drilled cuttings material to a thermal reactor.

2. Description of the Related Art

The prior art discloses a variety of systems and methods for the thermal treatment of material and thermal treatment of drilled cuttings material. For example, and not by way of limitation, the following U.S. patents present exemplary material treatment systems: U.S. Pat. Nos. 5,914,027; 5,724,751; and 6,165,349—all these patents incorporated fully herein for all purposes.

SUMMARY OF THE INVENTION

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

The present invention, in certain aspects, discloses a thermal treatment system for removing liquid from drill cuttings material, the thermal treatment system having a metering screw apparatus for receiving and feeding drill cuttings material to a reactor system, including apparatus and a control system for controlling the metering screw apparatus and for insuring that the metering screw apparatus is maintained full or nearly full of material and/or for controlling the mass flow rate into a reactor of the thermal treatment system by adjusting the speed of the metering screw apparatus.

The present invention, in certain aspects, discloses a thermal treatment system for treating drill cuttings material in which apparatus and a control system are provided to maintain an airlock at a material inlet to a thermal reactor of the thermal treatment system by maintaining a desired amount of material in a container above a feeder system that feeds material into the thermal reactor. In one aspect in such a system apparatus and a control system provide for control of temperature in the thermal reactor by controlling the mass flow rate of material into the thermal reactor by controlling a metering screw system that feeds material into the thermal reactor.

One illustrative embodiment disclosed herein is directed to a system that includes, among other things, a thermal reactor that is adapted to remove liquid from drill cuttings material by heating the drill cuttings material to at least a first temperature that is sufficiently high enough to vaporize the liquid. The illustrative system also includes a feeder system that is adapted to controllably feed a flow of the drill cuttings material to the thermal reactor, and a control system that is adapted to control the flow of the drill cuttings material from the feeder system so as to maintain a temperature in the thermal reactor at or above the first temperature.

Also disclosed herein is a thermal treatment system that includes a thermal reactor that is adapted to remove liquid from drill cuttings material, a feeder system that is adapted to controllably feed a flow of the drill cuttings material to the thermal reactor; and a control system that is adapted to control the feeder system so as to increase the flow of the drill cuttings material to the thermal reactor when a temperature in the thermal reactor decreases.

Another illustrative thermal treatment system disclosed herein includes, among other things, a thermal reactor having a plurality of rotatable friction elements, wherein the thermal reactor is adapted to remove liquid from drill cuttings material. The thermal treatment system also includes an engine that is adapted to controllably rotate the plurality of rotatable friction elements, wherein the plurality of rotatable friction elements are adapted to generate heat during the controllable rotation. Furthermore, the thermal treatment system is made up of a feeder system that includes a metering screw apparatus and a container positioned above the metering screw apparatus, wherein the container is adapted to receive the drill cuttings material and the feeder system is adapted to controllably feed a flow of the drill cuttings material to the thermal reactor. Additionally, the thermal treatment system includes a control system that is adapted to control the feeder system so as to increase the flow of the drill cuttings material to the thermal reactor when a temperature in the thermal reactor decreases, and to decrease the flow of the drill cuttings material to the thermal reactor when the temperature in the thermal reactor increases.

BRIEF DESCRIPTION OF THE DRAWINGS

The disclosure may be understood by reference to the following description taken in conjunction with the accompanying drawings, in which like reference numerals identify like elements, and in which:

FIG. 1A is a schematic view of a system according to the present invention;

FIG. 1B is a top view of the system of FIG. 1A;

FIG. 1C is a partial side view of part of the system of FIG. 1A;

FIG. 1F is a cross-section view of a container of a feeder system according to the present invention;

Figure 1D:
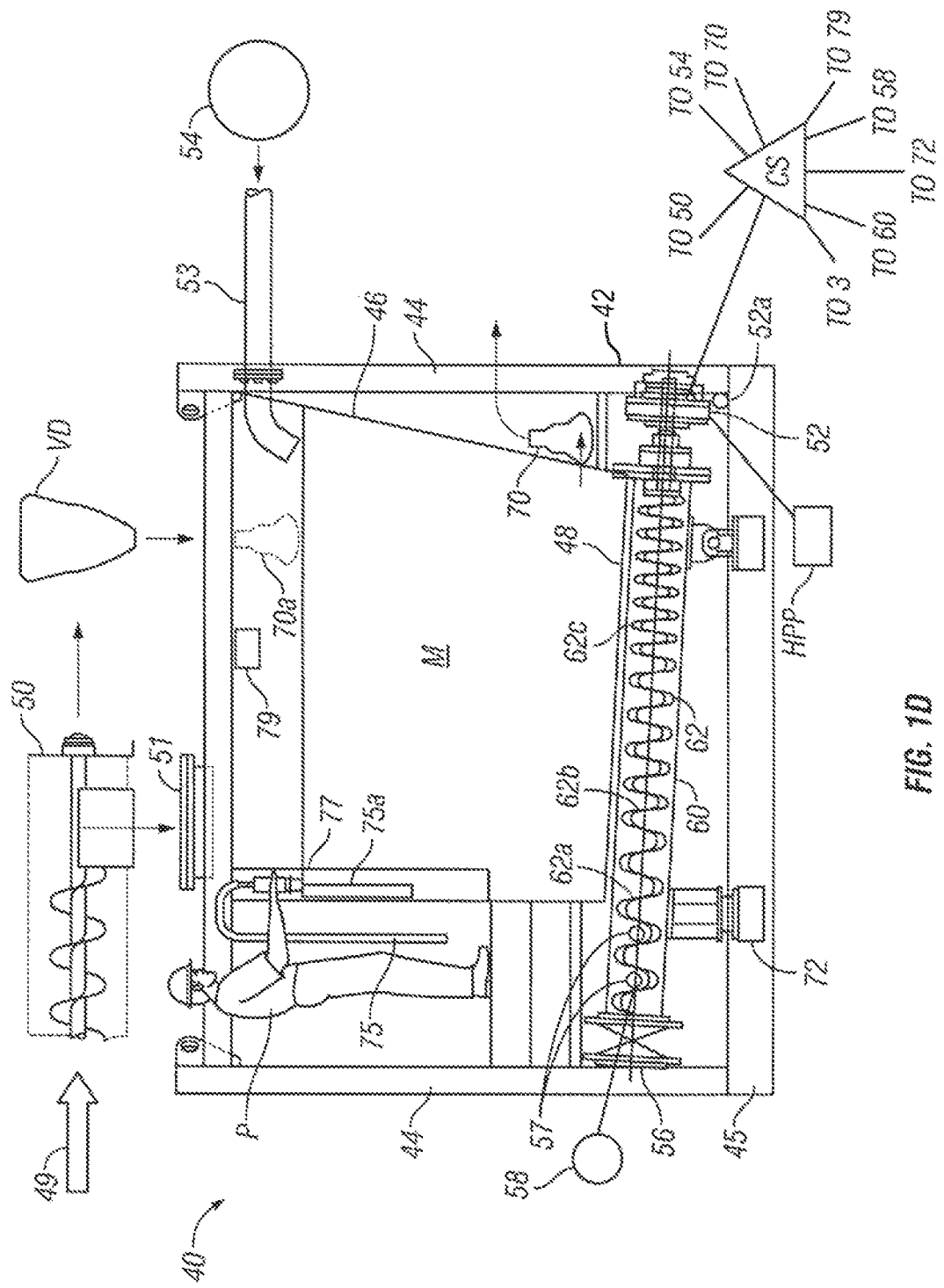
FIG. 1D is a cross-section view of a feeder system of the system of FIG. 1A.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIGS. 1A-1D illustrate a system 10 according to the present invention which has a thermal reactor section 12 and a feeder system 40 according to the present invention. Drill cuttings material M is fed from the feeder system 40 into a reactor vessel 14 (mounted on supports 18) of the thermal reactor section 12 through an inlet 13. Treated material exits the vessel 14 through a discharge outlet 15. An engine section 16 has an engine 17 that rotates internal rotors (or friction elements) 8 in the vessel 14. The vessel 14 has, optionally, a plurality of inlets 7 into which drill cuttings material for treatment can be fed. Load cell apparatuses 3 in communication with a control system CS indicate the amount of material in the vessel 14.

FIGS. 1C and 1D illustrate the feeder system 40 which has a base 42 with sides 44, 44a, and 44b, and a bottom 45 within which is mounted a container 46 for holding drill cuttings material to be fed to the vessel 14. It is within the scope of the present invention to have a container 46 with a substantially horizontal level bottom with a metering screw system beneath it which is also substantially horizontal; or, as shown in FIG. 1D, the container 46 has an inclined bottom 48 with a trough 47 and a metering screw system 60, which receives material from the container 46. The system 60 inclined to correspond to the incline of the bottom 48. Material falls into a trough 47 at the bottom of the container 46 (in which a screw 62 of the system 60 is located). The bottom of the container 46 may be any suitable shape to facilitate the flow and movement of material to the system 60; e.g. as shown in FIG. 1F, walls 46w of a container 46a are inclined above a trough 47a.

Drill cuttings material from a wellbore drilling operation indicated by an arrow 49 is fed by an auger apparatus 50 through an inlet 51 into the container 46. The drill cuttings material may come from any suitable apparatus or equipment, including, but not limited to, from shale shaker(s), centrifuge(s), tank(s), cuttings storage apparatus, vortex dryer(s), hydrocyclone(s), or any solids control equipment that produces a stream or discharge of drill cuttings material.

Optionally drill cuttings material is introduced into the container 46 through a line 53 from a system 54 (not directly from drilling operation equipment, like shale shakers or centrifuges) that transfers and/or transports drill cuttings material (e.g., but not limited to, the known BRANDT FREE FLOW (TRADEMARK) cuttings transfer and transportation system). Optionally, the material is fed to a vortex dryer VD for processing and the solids output of the vortex dryer is fed to the container 46.

A valve assembly 56 is used to selectively control the flow of free flowing material (e.g. liquids) from the system 60 into the vessel 14 as described below. Such liquids are not moved so much by the screw 62 as they flow freely past the screw 62 to the valve 56 through the system 60.

Optionally, (especially for material that may be easily compacted) if additional lubricant is needed for the material to be introduced into the vessel 14, the lubricant is injected into material in the system 60 through injection ports or nozzles 57 from a lubricant system 58 (e.g., but not limited to, a lubricant that is base oil, an oil component of a drilling fluid). In one aspect, if a load on a motor 52 which rotates the screw 62 (e.g. an hydraulic motor) is increased beyond a pre-selected set point, lubricant is injected through the nozzles 57 to facilitate material flow within the system 60 and lessen the load on the motor 52.

Optionally, a pump 70 in fluid communication with the interior of the container 46 pumps free liquid from within the container 46 to reduce the liquid content of the material. This can optimize the performance of the system by insuring that the feed to the vessel 14 has a reduced amount of free liquid. Optionally, as shown in dotted line in FIG. 1D, a pump 70a may be located within the container 46 (in one aspect, in the material M).

Figure 1E:
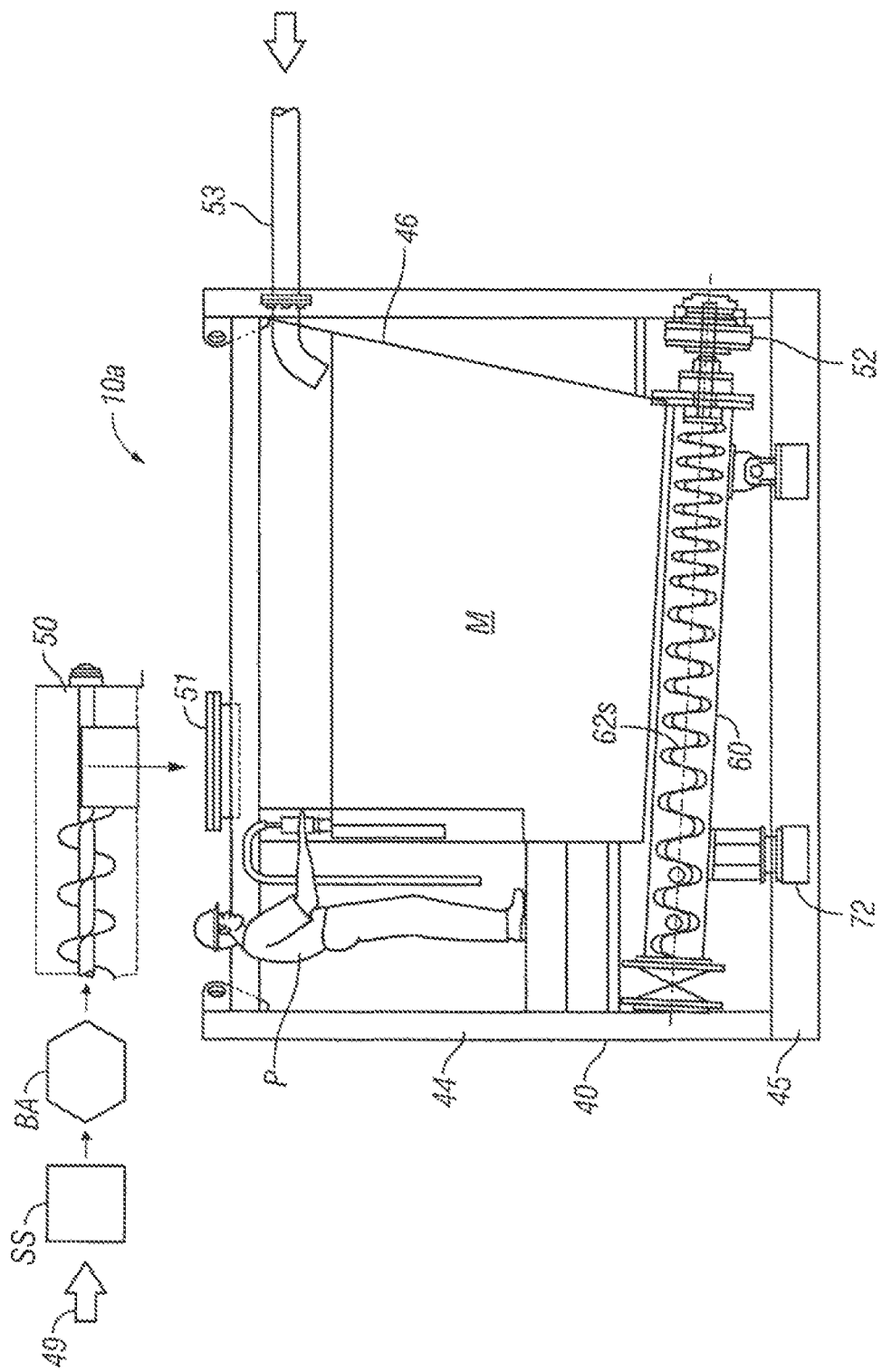
FIG. 1E is a cross-section view of a feeder system useful in a system like the system of FIG. 1A.

As shown in FIG. 1E, a conveyor apparatus for conveying material to a vessel like the vessel 14 can have a constant pitch screw 62s; or, as shown in FIG. 1D, the screw 62 of the system 60 has areas of different pitch, e.g. areas 62a, 62b, (with the tightest pitch at the end near the motor 52) and 62c which reduce the likelihood of material compaction in the system 60 and facilitates material flow in the system 60. In one particular aspect, the system 60 is about ten inches in diameter; the container 46 has a volume of about eighteen cubic meters; and the bottom 45 is about four meters long. In certain aspects, the container 46 has therein, at any given time, between three to sixteen cubic meters of material and, in one particular aspect, about sixteen cubic meters. The screw may have two, four or more areas of different pitch.

In one aspect, during operation of the system 10, an amount of material is maintained in the container 46 (e.g. in one aspect, a minimum of about three cubic meters) so that an "airlock," or sealing condition, may be created and substantially maintained at the inlet 13, thereby substantially preventing ingress of oxygen into the vessel 14. Additionally, by using the control system CS described below to ensure that a sufficient amount of material is maintained within the vessel 14, an airlock, or sealing condition, may also be created and substantially maintained at the discharge outlet 15 of the system 12. For example, in some illustrative embodiments, the system 10 may include a hopper (not shown) at the discharge outlet 15, and the control system CS may be adapted to control the flow of drill cuttings material through the vessel 14 such that a sufficient level of material is present in the hopper so as to thereby create and/or substantially maintain the previously described airlock condition at the outlet 15. In certain embodiments, the hopper (not shown) at the discharge outlet 15 may be, for example, a substantially vertically oriented pipe and the like, or a similar type of structure in which an appropriate level of drill cuttings material may be maintained. Furthermore, in at least some embodiments, the hopper (not shown) may include a level detection system, such as a level sensor and the like, which may provide information to the control system CS regarding the level of drill cuttings material in hopper, thereby enabling additional control of the airlock condition at the discharge outlet 15 as noted above.

Load cell apparatuses 72 (one, two, or more) indicate how much material (by weight) is in the container 46. This correlates with the level of the material so that, as shown in FIG. 1C, a level "a" can be maintained indicative of the volume of material sufficient to maintain the airlock at the inlet 13 described above. The load cell(s) is also used with the control system CS to calculate the rate of metering of material into the vessel 14 and to set and control maximum and minimum levels of material in the container 46. In one aspect the level "a" is between 50 mm and 1000 mm and, in one particular aspect, is 500 mm. Optionally, or in addition to the load sensor(s) 72, a level indicating apparatus 79 is used to obtain data to determine the amount of material in the container 46 and its level. In one aspect, the apparatus 79 is an ultrasonic distance measuring apparatus.

Personnel P can, optionally, remove free liquid from the top of material in the container 46 (e.g. from the top thereof) by manually placing an end 75a of a pipe 75 within a conduit 77 connected to the container 46 to pump free liquid (e.g. drilling fluid and some water, inter alia); from the container 46 thereby reducing the liquid content of material introduced into the vessel 14. In one aspect the pipe 75 is connected to the pump 70; or some other pump is used. In one aspect a pump system is placed within the container 46.

A control system CS controls the various operational parts and apparatuses of the system 10 as shown schematically in FIGS. 1A, 1B, and 1D. In particular aspects, the control system CS receives information from the load cell(s) 72, and from sensors 2 on the engine 17 (e.g. torque and/or speed in rpm's) and from sensor(s) 52a on the motor 52 (e.g. motor speed in rpm's). The control system CS controls the operation of the engine 17, the motor 52, the valve 56, the auger apparatus 50, the system 60, the system 58, the system 54, the pump 70, and an hydraulic power supply HPP which supplies power to the motor 52 and any other hydraulically powered item. In one aspect, sensing of the load on the motor 52 is done using a pressure sensor 52a (shown schematically). In one aspect, thus monitoring the pressure of hydraulic fluid applied to the motor 52 provides the information needed to activate the injection of additional lubricant via the nozzles 57. Via sensing of the temperature within the vessel 14 (using a sensor or sensors; e.g., in one aspect three sensors along the top of the vessel 14), the control system CS maintains the flow of material into the vessel 14 by controlling the system 40 at a sufficient rate such that the temperature within the vessel 14 is maintained at a sufficiently high level to effectively heat the drill cuttings material so that most, or substantially all, of any liquid phase(s) present in the material may be vaporized, however without exceeding a pre-defined maximum temperature—i.e., within an optimal temperature range.

For example, in certain illustrative embodiments, when the control system CS detects a temperature drop within the reactor vessel 14, it may be indicative that there is insufficient drill cuttings material inside of the vessel 14 to interact with the rotating friction elements 8 so as to thereby maintain the temperature at a sufficiently high level, as previously described. Accordingly, the control system CS may operate to control the feeder system 40 in such a manner as to increase the flow of drill cuttings material to the reactor vessel 14, thereby ensuring that there is sufficient drill cuttings material in the vessel 14 to interact with the friction elements 8, and so that the temperature within the vessel 14 may be substantially maintained above a pre-defined minimum value. On the other hand, when the control system CS detects a temperature increase within the reactor vessel 14, it may be indicative that, for example, the amount of drill cuttings material inside of the vessel 14 may be too great, or that the composition of the drill cuttings material being fed into the container 46 of the system 60 may have changed. In such circumstances, the control system CS may also operate to control the feeder system 40 so as to decrease the flow of drill cuttings material to the reactor vessel 14, thereby enabling the temperature within the vessel 14 to be controlled so that it is substantially maintained below the pre-defined maximum value, as noted above.

In various embodiments of the thermal treatment system disclosed herein, the motor 52, engine 17, pump 70 and/or other powered items in these systems can be powered electrically, pneumatically, or hydraulically.

In certain particular aspects, the oil content of feed into the container 46 is maintained between 15% to 30% by weight and the water content is maintained between 8% to 20% by weight.

In other aspects, the solids content of the material introduced into the container 46 is, preferably, at least 70% solids by weight; and the liquid content of the material fed into the vessel 14 is 30% or less (liquid includes oil and water). A pump or pumps (e.g., but not limited to, the pump 70) reduces (and, in certain aspects, minimizes) the amount of free liquid fed to the vessel 14. If too much liquid is fed into the vessel 14, undesirable "wash out" may occur, a sufficient amount of solids will not be present, and, therefore, sufficient friction will not be developed to achieve a desired temperature within the vessel 14 for effective operation. In certain aspects, and depending on the specific of the material content of the solids and/or liquid phase(s), the temperature within the vessel 14 may be maintained by the control system CS between a pre-defined minimum value of approximately 250 degrees Centigrade and a pre-defined maximum value of approximately 400 degrees Centigrade.

It is also desirable for efficient operation that the engine 17 operate at an optimal loading, e.g. at 95% of its rated capacity. If the control system CS learns, via a speed sensor 2 on the engine 17 that the RPM's of the engine 17 are dropping off from a known maximum, this may indicate too much material is being fed into the vessel 14. The control system CS then reduces the mass transfer rate into the vessel 14 (by controlling the system 60). Power generated typically drops off as the RPM's drop off, as can be seen on a typical performance curve. Insuring that the power generated is maximized provides the maximum energy available to generate the heat required within the vessel 14.

Initially at start up, in one aspect, the valve 56 is opened slowly. As free flowing liquid and material flow into the vessel 14, the temperature is maintained. If there is no dramatic drop in temperature, this indicates that the flow of material has an appropriate liquid content so that a desired operational temperature and effective operation can be achieved. Then the valve 56 is fully opened as the system 60 is controlled by the control system CS and full flow commences.

The container 46 may be filled continuously or in batches.

FIG. 1E shows a system 10a, like the system 10 described above, and like numerals indicate like parts. The initial feed of drill cuttings material to the container 46 is from one or more shale shakers SS (or other processing equipment) whose drill cuttings material output (e.g. off the tops of the shaker screens or from a centrifuge) is fed to a buffer apparatus BA to maintain a desired liquid content of the material in the container 46, and, in one aspect, to minimize this liquid content. The buffer apparatus BA can be any suitable system or apparatus; e.g., but not limited to: a system according to the present invention (e.g., but not limited to a system as in FIG. 1A, 2A, or 3); a storage system for drill cuttings material; a skip system; a cuttings containment and transfer system (e.g., but not limited to, a known system as disclosed in U.S. Pat. No. 7,195,084, co-owned with the present invention); or a transfer/transport system, e.g., but not limited to, the BRANDT FREE FLOW (TRADEMARK) systems.

Figure 2A:
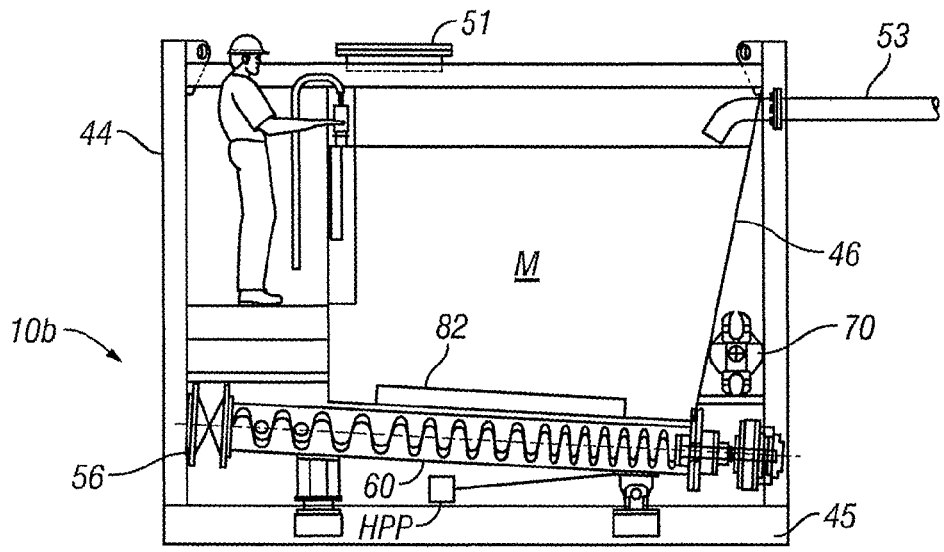
FIG. 2A is a side cross-section view of a feeder system according to the present invention.
Figure 2B:
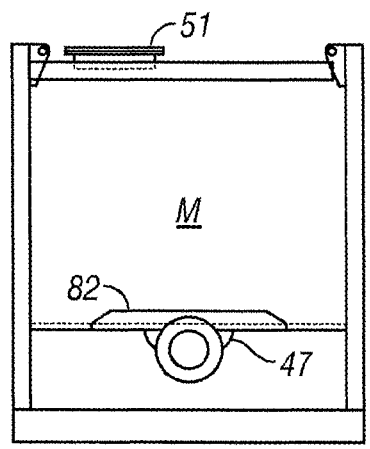
FIG. 2B is an end view of the system of FIG. 2A.
Figure 2C:
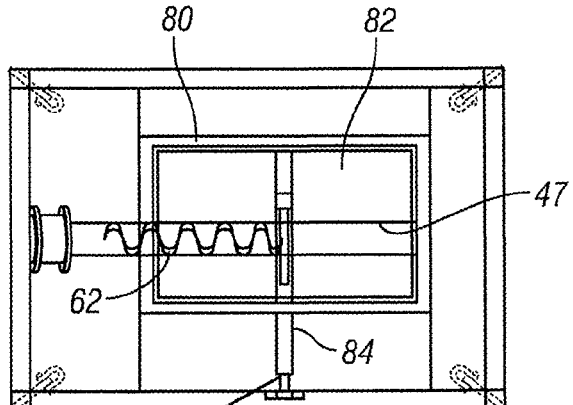
FIG. 2C is a top view of the system of FIG. 2A.
Figure 2D:
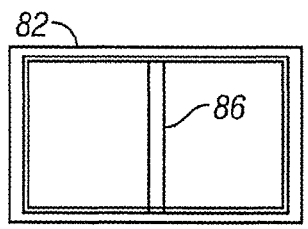
FIG. 2D is a top view of part of the system of FIG. 2A.
Figure 2E:
FIG. 2E is an end view of a slide of the system of FIG. 2A.

FIG. 2A shows a system 10b like the system 10 described above and like numerals indicate like parts.

The system 10b has a slider system 80 with a slider frame 82 selectively movable by a piston mechanism 84 with one part connected to the slider frame 82 and controlled by the control system CS. Power for the piston mechanism 84 is provided by an hydraulic power pack HPP (which also provides power to the motor 52). The slider frame 82 moves material on the bottom 48 of the container 46 to facilitate the flow of material down to the screw 62 of the system 60. A slider frame may be used as shown in U.S. Pat. No. 7,195,084.

The slider frame 82 has a central beam 86, and, optionally, beveled end edges 88. The slider frame 82 moves material facilitating its entry into a trough 47 in which is located the screw 62. Optionally, the slider frame 82 is smaller than shown with no central beam 86 and is movable to and from the trough 47 on both sides thereof.

Figure 3:
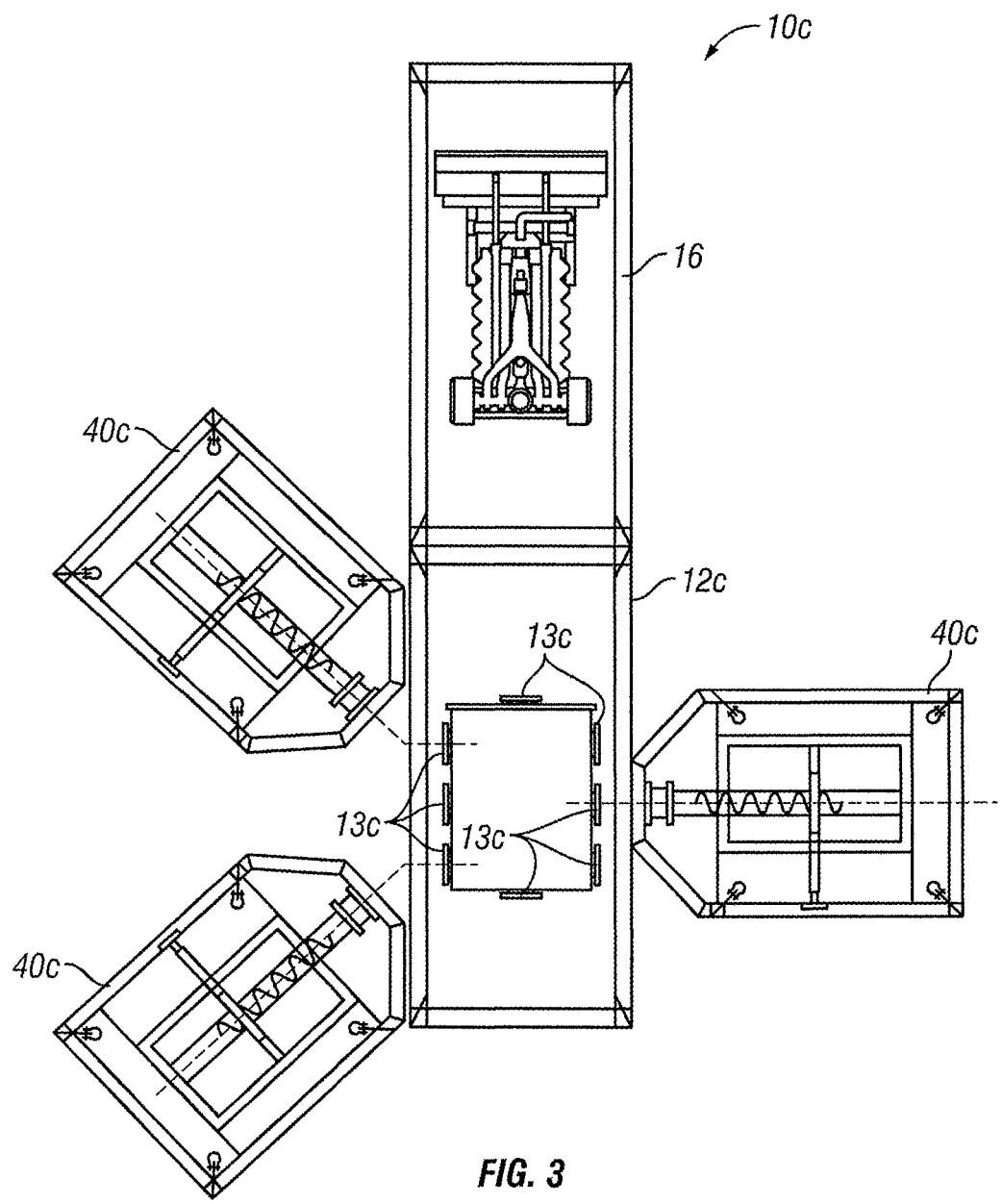
FIG. 3 is a top view of a system according to the present invention.

FIG. 3 illustrates a system 10c, like the system 10, and like numerals indicate like parts The reactor section 12c has multiple material inlets 13c into which material is introducible into a vessel 14c. One feeder system may be used at one inlet 13c or multiple feeder systems 40c may be used (three shown in FIG. 3).

Figure 4:
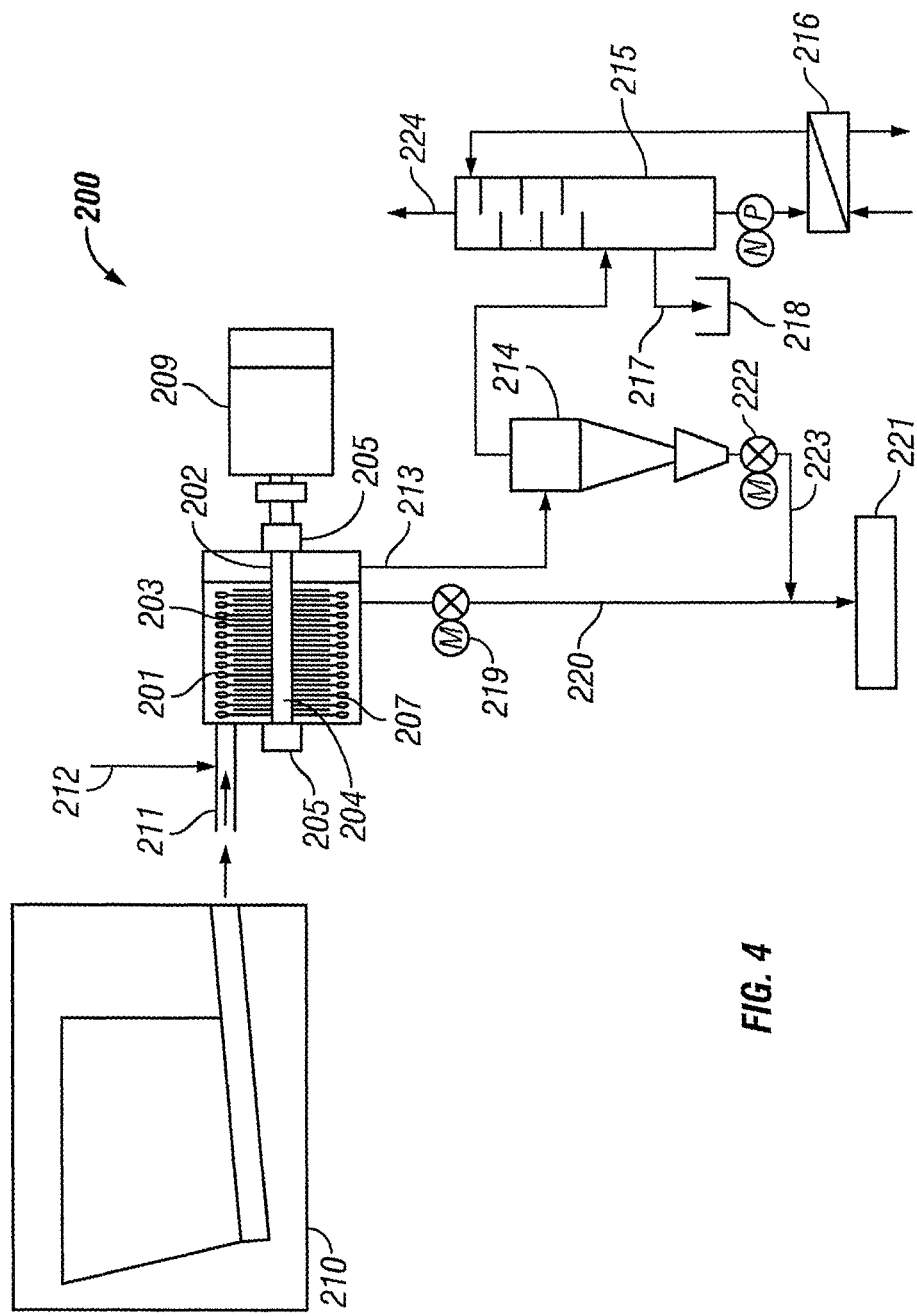
FIG. 4 is a schematic view of a system according to the present invention.

FIG. 4 illustrates improvements to systems of U.S. Pat. No. 5,914,027 (fully incorporated herein for all purposes) and shows a system 200 with a feeder system 210 (like any feeder system disclosed herein according to the present invention) which feeds material into a reactor chamber or vessel 201 with a rotor 202 including friction elements 203. The rotor 202 further includes a shaft 204 sealed in the reactor with mechanical seals 205. The friction elements 203 are pivotably mounted in rotor plates 207 (as in U.S. Pat. No. 5,914,027). Each pair of adjacent rotor plates 207 carries a number of friction elements 203. The friction elements 203 are staggered relative to each other. The staggered arrangement may achieve turbulent action in a bed of grained solids in the vessel. The friction elements 203 are pivotably mounted in between adjacent rotor plates 207 by rods extending over the length of the rotor 202 (as in U.S. Pat. No. 5,914,027).

The rotor 202 is driven by a rotating source 209 which can be an electrical motor, a diesel engine, a gas or steam turbine or the like. The material is brought to the reactor from the feeder system 210 via a line 211. Water and/or oil (e.g., base oil) can be added to the flow from the pipe 212. Cracked hydrocarbon gases (and, in one aspect, over-saturated steam) leaves the reactor via a line 213 and, in one aspect, flows to a cyclone 214 and proceed to a condenser unit 215 which can be a baffle tray condenser, a tubular condenser or a distillation tower. The different fractions of the oil can be separated directly from the recovered hydrocarbon gases. The heat from condensation is removed by an oil cooler 216 cooled either by water or air. The recovered oil is discharged from the condenser by a pipe 217 to a tank 218.

Solids leave the reactor via a rotating valve 219 and a transport device 220 which can be a screw or belt conveyor or an air transportation pipe system to a container 221. The solids separated from the cyclone 214 are transported via a rotating valve 222 to the container 221 either by being connected to the transport device 220 or directly to the container 221 by a cyclone transport device 223.

In certain illustrative embodiments, a control system, such as the control system CS of the thermal treatment system 10 shown in FIGS. 1A-1D above, may control the rotating valve 219 so that an airlock condition may be created and/or substantially maintained at the discharge outlet of the reactor vessel 201, as previously described. Furthermore, in certain embodiments the rotating valve 219 may also be controlled by the control system so as to permit an increased flow of material from the reactor vessel 201 when, for example, the control system detects a reduction in the rotational speed of the rotating source 209, which, as previously described regarding the thermal treatment system 10 above, may be an indication that too much material is present in the reactor vessel 201.

Non-condensable gases exit in a pipe 224 and can flow from the pipe 224 to a filter unit or to a flare tower or are accumulated in a pressure tank—not shown. The system 200 may be operated in any way described in U.S. Pat. No. 5,914,027. The items downstream of the vessel 201 may be used with any system according to the present invention.

Figure 5:
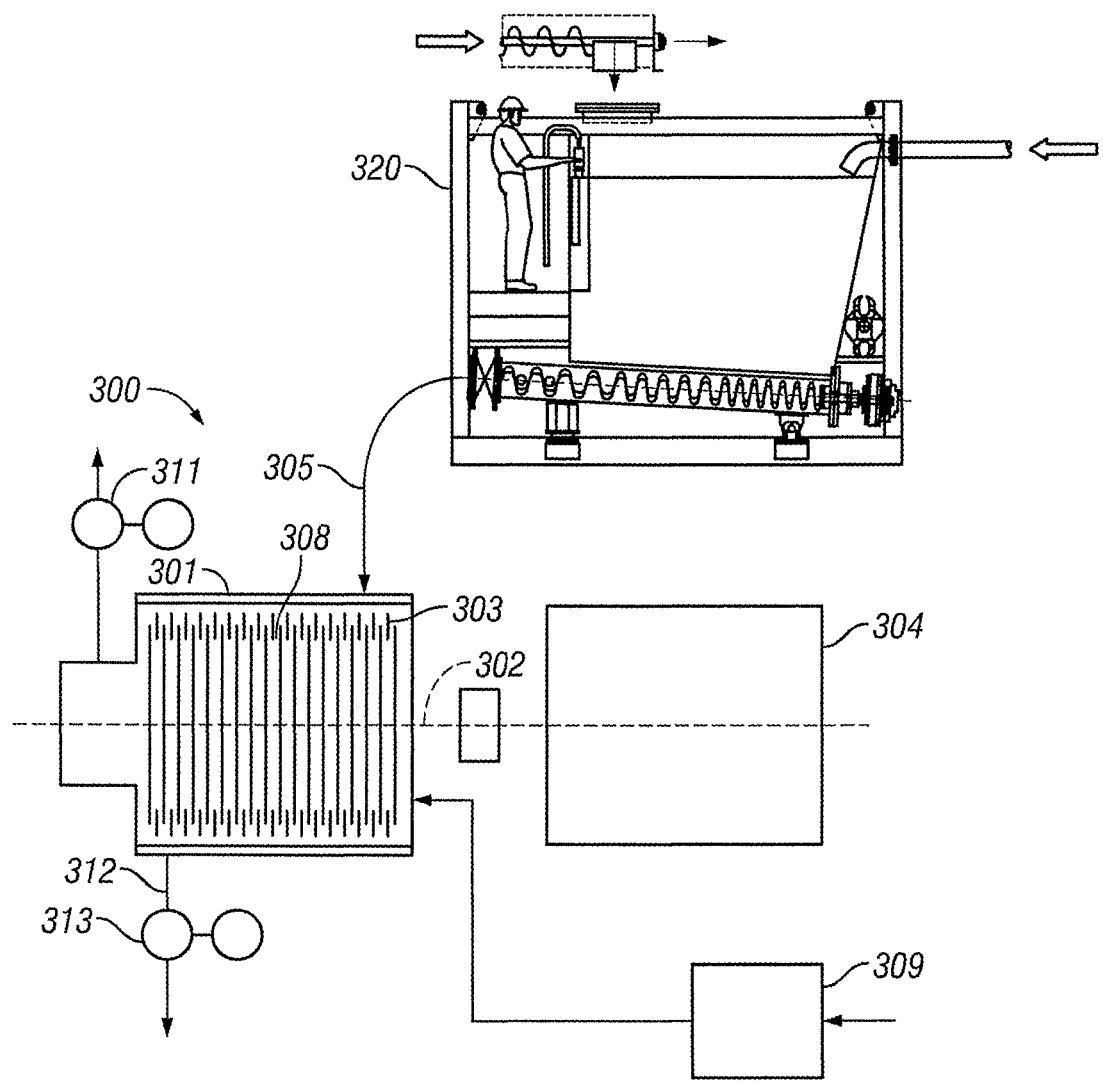
FIG. 5 is a schematic view of a system according to the present invention.

FIG. 5 illustrates that the present invention provides improvements to the systems and methods of U.S. Pat. No. 5,724,751 (fully incorporated herein for all purposes) and shows a system 300 according to the present invention with a process chamber with a rotor 302 and blades 303 driven by an engine 304. A mass of material is fed into the process chamber (as indicated by feed arrow 305) by a feeder system 320 (any feeder system disclosed herein according to the present invention). The mass in the process chamber is whipped by the blades and subjected to energy or vibrations from the said blades and ribs 308, which are sufficiently closely spaced to each other to cause turbulence during the rotation of the blades. Additional energy may be supplied in some form of heated gas from a combustion engine 309. Gases, mist and vapors leave the process chamber 301 via an output opening via a vent fan 311 and on to either open air or to a condenser. Dried material is led through an output opening 312 via a rotating gate 313. The system 300 may be operated in any way described in U.S. Pat. No. 5,724,751. The items downstream of the process chamber of the system 300 may be used with any system according to the present invention.

The present invention, therefore, provides in some, but not in necessarily all, embodiments a thermal treatment system for removing liquid from drill cuttings material, the thermal treatment system having a metering screw apparatus for receiving and feeding drill cuttings material to a reactor system, including apparatus and a control system for controlling the metering screw apparatus and for insuring that the metering screw apparatus is maintained full or nearly full of material and/or for controlling the mass flow rate into a reactor of the thermal treatment system by adjusting the speed of the metering screw apparatus.

The present invention, therefore, provides in some, but not in necessarily all, embodiments a thermal treatment system for treating drill cuttings material in which apparatus and a control system are provided to maintain an airlock at a material inlet to a thermal reactor of the thermal treatment system by maintaining a desired amount of material in a container above a feeder system that feeds material into the thermal reactor.

Any system according to the present invention may include one or some, in any possible combination, of the following: wherein apparatus and a control system provide for control of temperature in the thermal reactor by controlling the mass flow rate of material into the thermal reactor by controlling a metering screw system that feeds material into the thermal reactor; wherein the thermal treatment system has an engine that rotates friction elements within a reactor vessel of the thermal reactor and performance of said engine is optimized by controlling a metering screw system that feeds material into the reactor vessel (e.g., based on sensed speed in rpm's of said engine); a sensor or sensors or at least one load cell apparatus or two load cell apparatuses beneath the container to provide information to indicate an amount of material in the container; a sensor or sensors or at least one load cell apparatus or two load cell apparatuses beneath the thermal reactor to provide information to assist in control of the discharge rate of solids from the thermal reactor; wherein a control system controls the amount of material in the thermal reactor; wherein the control system controls said amount to maintain an airlock at the discharge from the thermal reactor; apparatus and a control system to maintain a desired temperature in the thermal reactor; a first feed of drilling cuttings material into the container; wherein the first feed is from drilling operations solids control equipment which is at least one of shale shaker, centrifuge, vortex dryer, and hydrocyclone; wherein the first feed is from a cuttings conveyance system; a secondary feed into the container from a cuttings storage or transfer system; and/or apparatus and a control system for control of temperature in the thermal reactor by controlling the mass flow rate of material into the thermal reactor by controlling a metering screw system that feeds material into the thermal reactor; the thermal treatment system having an engine that rotates friction elements within a reactor vessel of the thermal reactor and performance of said engine is optimized by controlling a metering screw system that feeds material into the reactor vessel (e.g., based on sensed speed in rpm's of said engine); at least one load cell apparatus or two load cell apparatuses beneath the container to provide information to indicate an amount of material in the container.

The particular embodiments disclosed above are illustrative only, as the invention may be modified and practiced in different but equivalent manners apparent to those skilled in the art having the benefit of the teachings herein. For example, the method steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A system, comprising:
a thermal reactor that is adapted to remove liquid from drill cuttings material by heating said drill cuttings material to at least a first temperature, wherein said first temperature is sufficiently high enough to vaporize said liquid;
a feeder system that is adapted to controllably feed a flow of said drill cuttings material to said thermal reactor; and
a control system that is adapted to control said flow of said drill cuttings material from said feeder system to said thermal reactor so as to maintain a temperature in said thermal reactor at or above said first temperature, wherein said control system is further adapted to increase said flow of said drill cuttings material from said feeder system to said thermal reactor when said temperature in said thermal reactor decreases.

2. A thermal treatment system, comprising:
a thermal reactor that is adapted to remove liquid from drill cuttings material;
a feeder system that is adapted to controllably feed a flow of said drill cuttings material to said thermal reactor; and
a control system that is adapted to control said feeder system so as to increase said flow of said drill cuttings material to said thermal reactor when a temperature in said thermal reactor decreases.

3. The system of claim 2, wherein said control system is adapted to decrease said flow of said drill cuttings material from said feeder system to said thermal reactor when said temperature in said thermal reactor increases.

4. The thermal treatment system of claim 2, wherein said control system is adapted to control a level of said drill cuttings material in said feeder system so as to substantially maintain an airlock condition at a material inlet to said thermal reactor.

5. The thermal treatment system of claim 2, wherein said feeder system comprises a metering screw apparatus and a container that is adapted to receive said drill cuttings material.

6. The thermal treatment system of claim 5, wherein said metering screw apparatus comprises a metering screw having areas of different screw pitch.

7. The thermal treatment system of claim 5, wherein said control system is adapted to maintain at least one of a minimum amount of said drill cuttings material in said container and a minimum level of said drill cuttings material above said metering screw apparatus.

8. The thermal treatment system of claim 7, wherein said feeder system comprises at least one load cell apparatus that is adapted to provide information to said control system that is indicative of an amount of said drill cuttings material in said container.

9. The thermal treatment system of claim 7, wherein said feeder system comprises a slider system that is adapted to facilitate movement of said drilling cuttings material in a lower portion of said container proximate said metering screw apparatus.

10. The thermal treatment system of claim 5, wherein said container is adapted to receive a first feed of drill cuttings material from at least one of a shale shaker, a centrifuge, a vortex dryer, and a hydrocyclone.

11. The thermal treatment system of claim 10, further comprising a conveyance system that is adapted to feed said first feed of drill cuttings material to said container.

12. The thermal treatment system of claim 10, wherein said container is adapted to receive a secondary feed of drill cuttings material from at least one of a cuttings storage system and a cuttings transfer system.

13. The thermal treatment system of claim 2, further comprising a temperature sensing apparatus that is adapted to provide information to said control system that indicates said temperature in said thermal reactor.

14. The thermal treatment system of claim 2, wherein said control system is adapted to control said temperature in said thermal reactor.

15. The thermal treatment system of claim 14, wherein said control system is adapted to maintain said temperature in said thermal reactor above a pre-defined minimum temperature and below a pre-defined maximum temperature.

16. The thermal treatment system of claim 2, further comprising an engine that is adapted to controllably rotate a plurality of rotatable friction elements inside of said thermal reactor, wherein said plurality of rotatable friction elements are adapted to generate heat during said controllable rotation.

17. The thermal treatment system of claim 16, wherein said control system is adapted to decrease said flow of said drill cuttings to said thermal reactor when a rotational speed of said engine decreases.

18. The thermal treatment system of claim 17, wherein said engine comprises a speed sensor that is adapted to provide information to said control system that indicates said rotational speed of said engine.

19. The thermal treatment system of claim 2, wherein said control system is adapted to control an amount of said drill cuttings material in said thermal treatment system so as to substantially maintain an airlock condition at a material outlet from said thermal reactor.

20. The thermal treatment system of claim 2, wherein said thermal reactor comprises at least one load cell apparatus that is adapted to provide information to said control system that is indicative of an amount of drill cuttings material in said thermal reactor.

21. A thermal treatment system, comprising:
- a thermal reactor comprising a plurality of rotatable friction elements, wherein said thermal reactor is adapted to remove liquid from drill cuttings material;
- an engine that is adapted to controllably rotate said plurality of rotatable friction elements, wherein said plurality of rotatable friction elements are adapted to generate heat during said controllable rotation;
- a feeder system comprising a metering screw apparatus and a container positioned above said metering screw apparatus, wherein said container is adapted to receive said drill cuttings material and said feeder system is adapted to controllably feed a flow of said drill cuttings material to said thermal reactor; and
- a control system that is adapted to control said feeder system so as to increase said flow of said drill cuttings material to said thermal reactor when a temperature in said thermal reactor decreases, and to decrease said flow of said drill cuttings material to said thermal reactor when said temperature in said thermal reactor increases.

22. The thermal treatment system of claim 21, wherein said control system is adapted to control a level of said drill cuttings material in said feeder system so as to substantially maintain an airlock condition at a material inlet to said thermal reactor, and wherein said control system is further adapted to control an amount of said drill cuttings material in said thermal treatment system so as to substantially maintain an airlock condition at a material outlet from said thermal reactor.

23. A system, comprising:
- a thermal reactor that is adapted to remove liquid from drill cuttings material by heating said drill cuttings material to at least a first temperature, wherein said first temperature is sufficiently high enough to vaporize said liquid;
- a feeder system that is adapted to controllably feed a flow of said drill cuttings material to said thermal reactor; and
- a control system that is adapted to control said flow of said drill cuttings material from said feeder system to said thermal reactor so as to maintain a temperature in said thermal reactor at or above said first temperature, wherein said control system is adapted to decrease said flow of said drill cuttings material from said feeder system to said thermal reactor when said temperature in said thermal reactor increases.

* * * * *